US012645364B1

(12) United States Patent
Penth et al.

(10) Patent No.: US 12,645,364 B1
(45) Date of Patent: Jun. 2, 2026

(54) PERFORMING A READ OPERATION AND A CLEAR OPERATION IN A LATE SELECT ARRAY IN THE SAME CLOCK CYCLE

(71) Applicant: INTERNATIONAL BUSINESS MACHINES CORPORATION, Armonk, NY (US)

(72) Inventors: Silke Penth, Holzgerlingen (DE); Harry Barowski, Schoenaich (DE); Amira Rozenfeld, Rochester, MN (US); Simon Brandl, Munich (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/981,959

(22) Filed: Dec. 16, 2024

(51) Int. Cl.
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
CPC .... G06F 3/06; G06F 12/0877; G06F 12/0888; G06F 12/0891; G06F 12/0893; G06F 12/0895
See application file for complete search history.

(56) References Cited

U.S. PATENT DOCUMENTS

| | | | |
|---|---|---|---|
| 5,197,139 | A | 3/1993 | Emma et al. |
| 7,054,184 | B2 | 5/2006 | Chan et al. |
| 7,284,097 | B2 | 10/2007 | Dodson et al. |
| 7,355,907 | B2 | 4/2008 | Chen et al. |
| 12,038,819 | B2 | 7/2024 | Patle et al. |
| 2014/0052914 | A1* | 2/2014 | Wang .................. G06F 12/0846 711/119 |
| 2016/0118089 | A1* | 4/2016 | Ebeling ............ H03K 19/17764 711/109 |
| 2023/0195368 | A1* | 6/2023 | Agarwal ............... G06F 3/0604 711/154 |

(Continued)

OTHER PUBLICATIONS

Authors et al., "Avoiding Deadlocks in a Multi-Processor Environment with a First Level Cache Using a Logical Directory", IP.com No. IPCOM000271077D, Oct. 12, 2022, 05 pages.

(Continued)

*Primary Examiner* — Khoa D Doan
(74) *Attorney, Agent, or Firm* — Onyx IP Group

(57) ABSTRACT

Performing a read operation and a clear operation in a late select array in the same clock cycle, including: receiving, for a late select array stored in memory of a processor, a read operation instruction and a clear operation instruction; executing both the read operation instruction and the clear operation instruction in a single clock cycle, including: loading an entry of the late select array corresponding to a read address included in the read operation instruction; generating a hit result for the read operation instruction based on the entry, wherein the hit result indicates whether a cache stores valid data corresponding to the read operation instruction; clearing an entry of the late select array corresponding to a write address included in the clear operation instruction; and providing an output of the read operation instruction based on a comparison of the read address included in the read operation instruction and the write address included in the clear operation instruction.

20 Claims, 8 Drawing Sheets

(56)  References Cited

U.S. PATENT DOCUMENTS

2024/0069737 A1\*  2/2024  Ray ...................... G06F 9/3853
2024/0135483 A1   4/2024  Wang et al.

OTHER PUBLICATIONS

Authors et al., "Icache Directory Error Injection to Cause Icache Hits with State Data by Erroneously Setting Extra Sector Valid Bit", IP.com No. IPCOM000216954D, Apr. 25, 2012, 03 pages.
Authors et al., "Set Prediction Multihit Avoidance Mechanism in an Effective Address-Based Processor Core Data Cache", IP.com No. IPCOM000267881D, Dec. 1, 2021, 04 pages.
CSE: "Advanced Caching Techniques", Autumn 2006, Year 2006, 11 pages.
Patterson, D, "Directory-based Cache Coherence Protocols", Material in this lecture in Henessey and Patterson, Chapter 8, 2006, pp. 677-685.
International Searching Authority, "Notification of Transmittal of the International Search Report and the Written Opinion of the International Searching Authority, or Declaration," Patent Cooperation Treaty Feb. 18, 2026, 09 pages, International Application No.-PCT/EP2025/085103.

\* cited by examiner

100

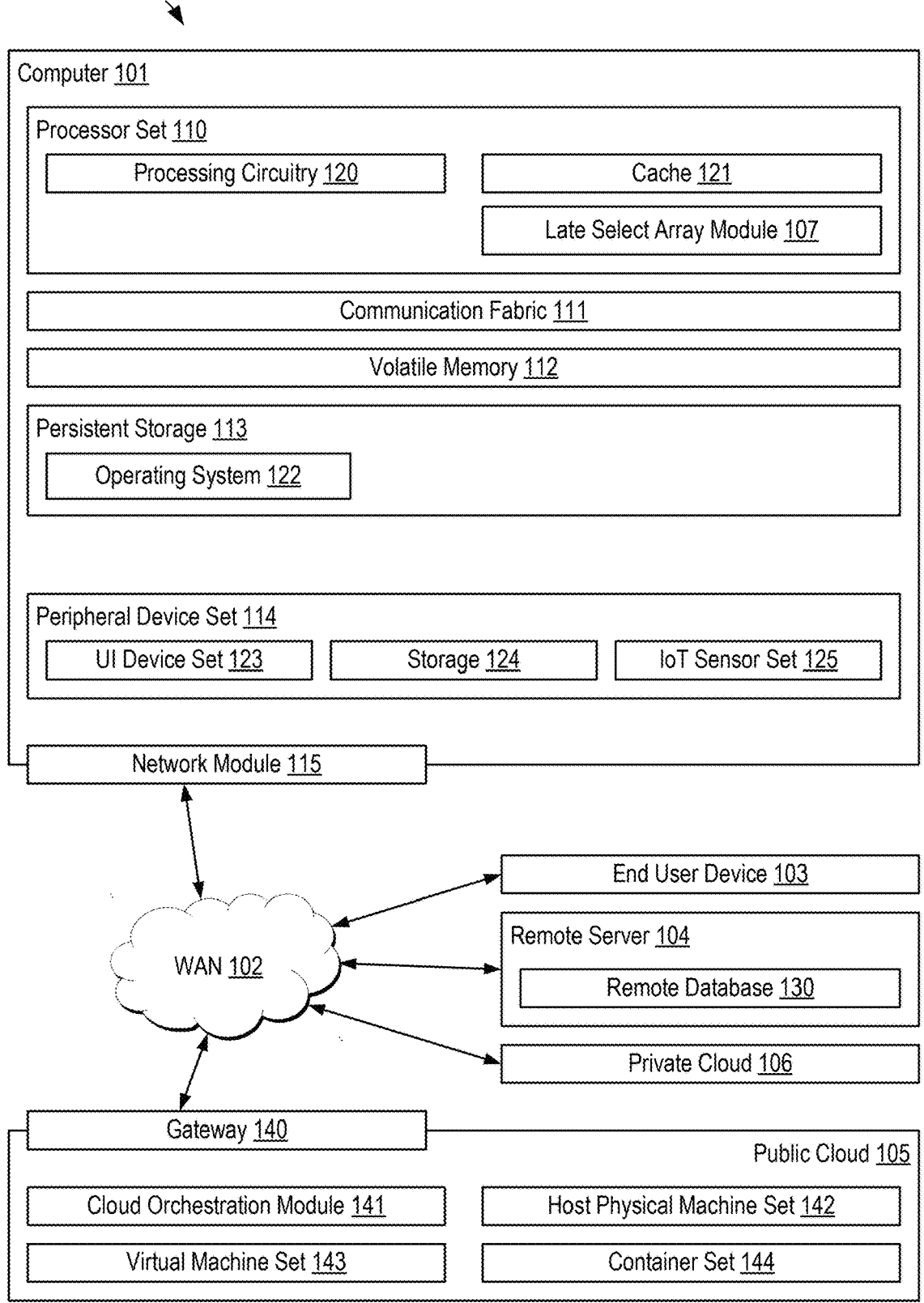

Computer 101

Processor Set 110

Processing Circuitry 120

Cache 121

Late Select Array Module 107

Communication Fabric 111

Volatile Memory 112

Persistent Storage 113

Operating System 122

Peripheral Device Set 114

UI Device Set 123

Storage 124

IoT Sensor Set 125

Network Module 115

WAN 102

End User Device 103

Remote Server 104

Remote Database 130

Private Cloud 106

Gateway 140

Public Cloud 105

Cloud Orchestration Module 141

Host Physical Machine Set 142

Virtual Machine Set 143

Container Set 144

FIG. 1

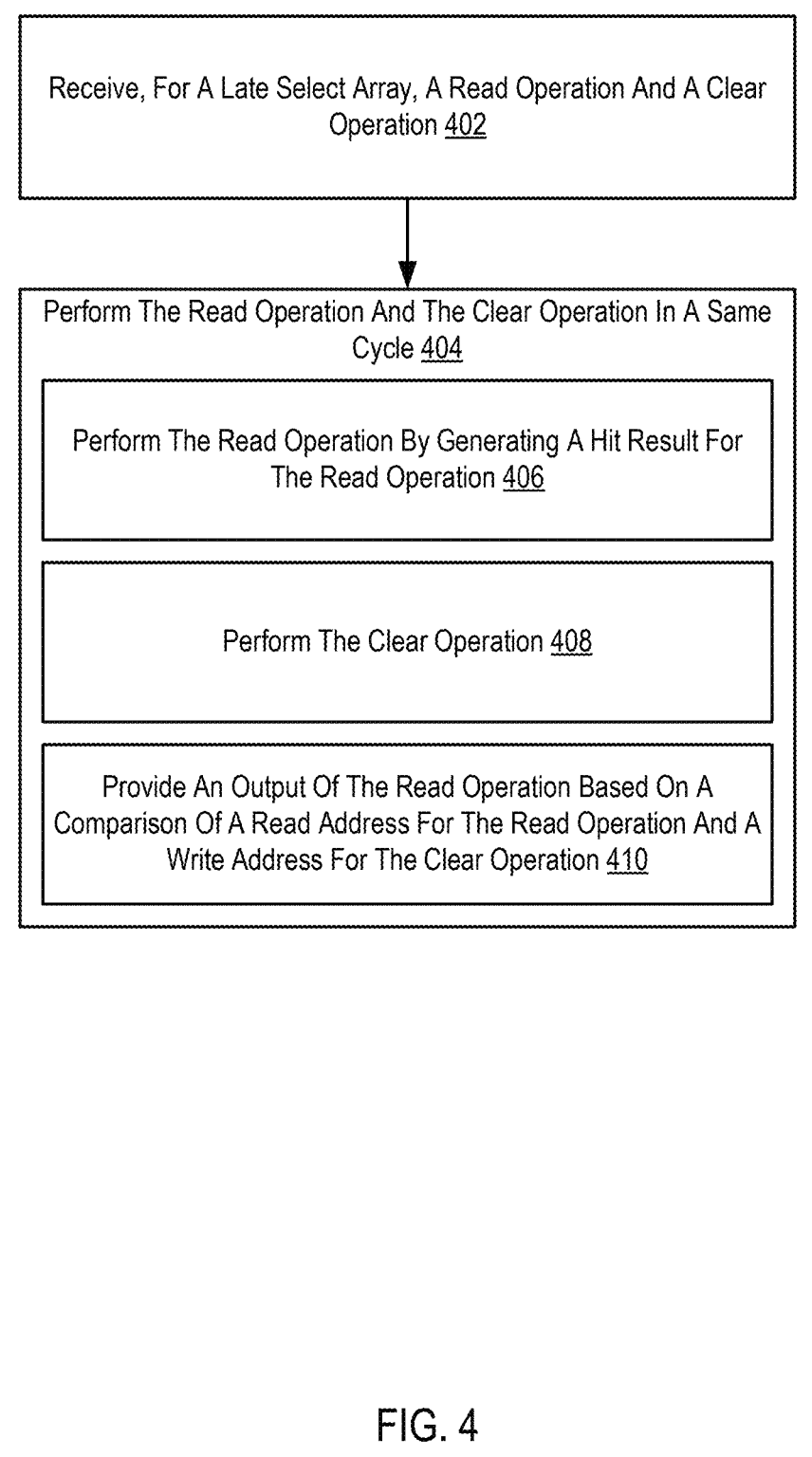

Receive, For A Late Select Array, A Read Operation And A Clear Operation 402

Perform The Read Operation And The Clear Operation In A Same Cycle 404

Perform The Read Operation By Generating A Hit Result For The Read Operation 406

Perform The Clear Operation 408

Provide An Output Of The Read Operation Based On A Comparison Of A Read Address For The Read Operation And A Write Address For The Clear Operation 410

FIG. 4

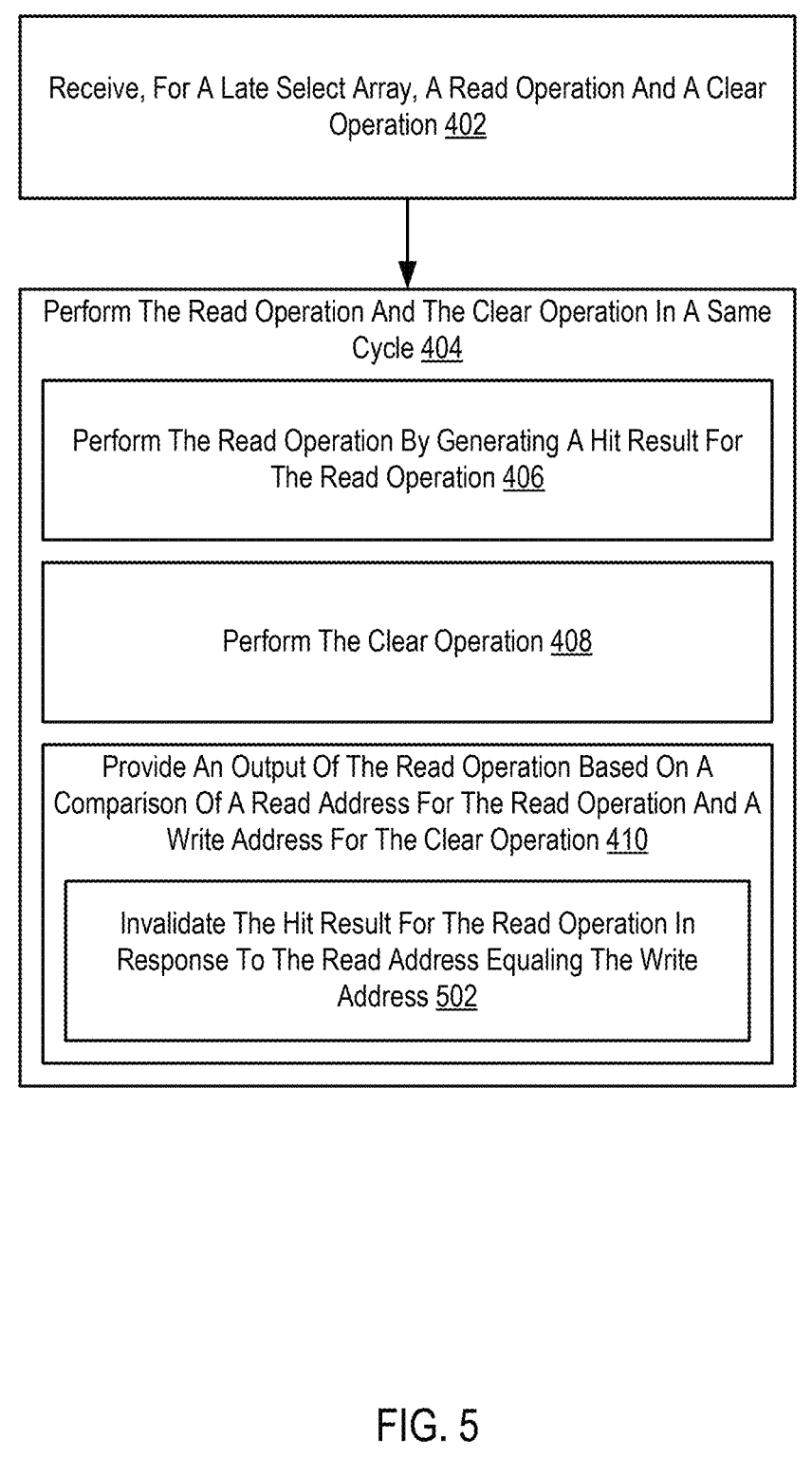

Receive, For A Late Select Array, A Read Operation And A Clear Operation 402

Perform The Read Operation And The Clear Operation In A Same Cycle 404

Perform The Read Operation By Generating A Hit Result For The Read Operation 406

Perform The Clear Operation 408

Provide An Output Of The Read Operation Based On A Comparison Of A Read Address For The Read Operation And A Write Address For The Clear Operation 410

Invalidate The Hit Result For The Read Operation In Response To The Read Address Equaling The Write Address 502

FIG. 5

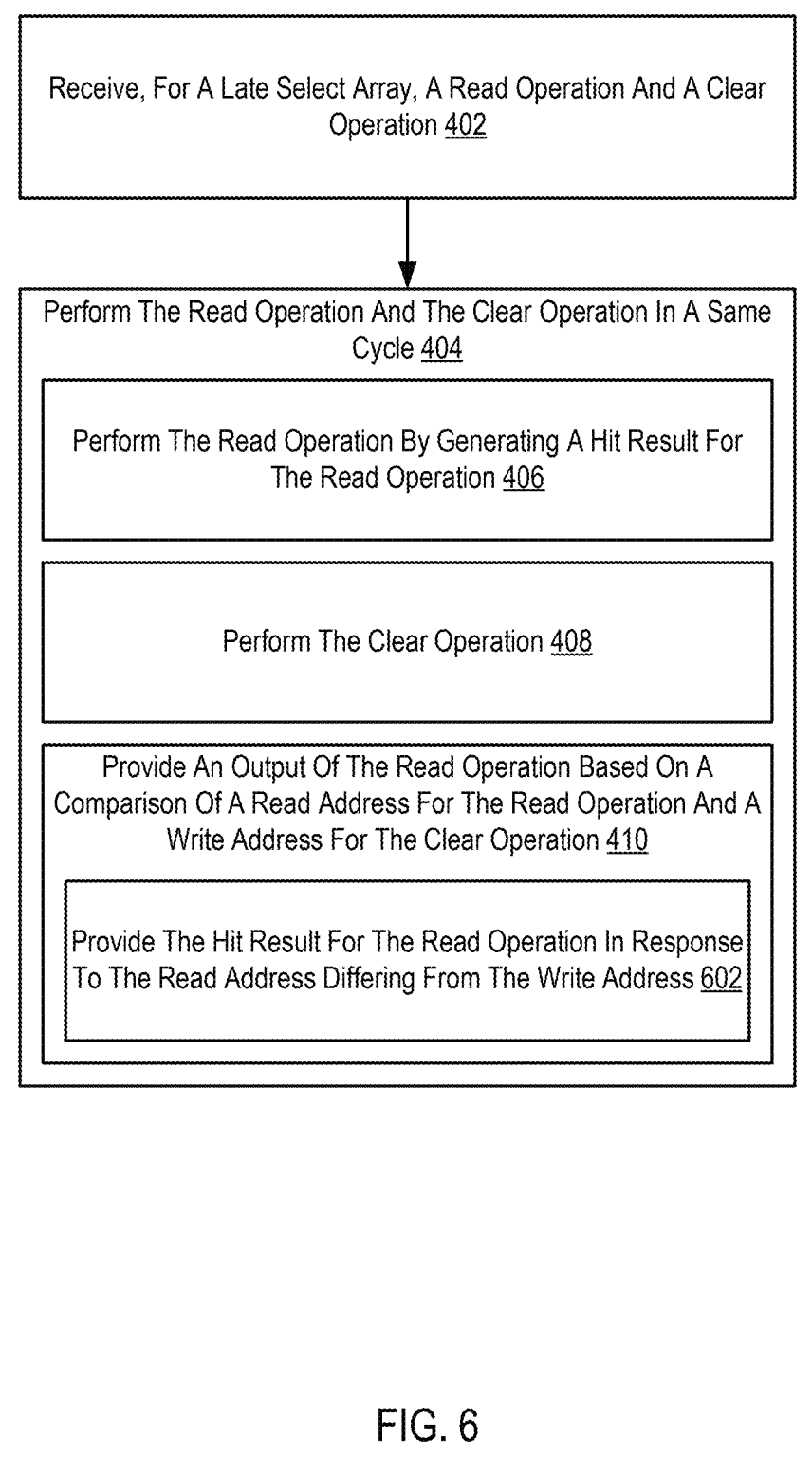

Receive, For A Late Select Array, A Read Operation And A Clear Operation 402

Perform The Read Operation And The Clear Operation In A Same Cycle 404

Perform The Read Operation By Generating A Hit Result For The Read Operation 406

Perform The Clear Operation 408

Provide An Output Of The Read Operation Based On A Comparison Of A Read Address For The Read Operation And A Write Address For The Clear Operation 410

Provide The Hit Result For The Read Operation In Response To The Read Address Differing From The Write Address 602

FIG. 6

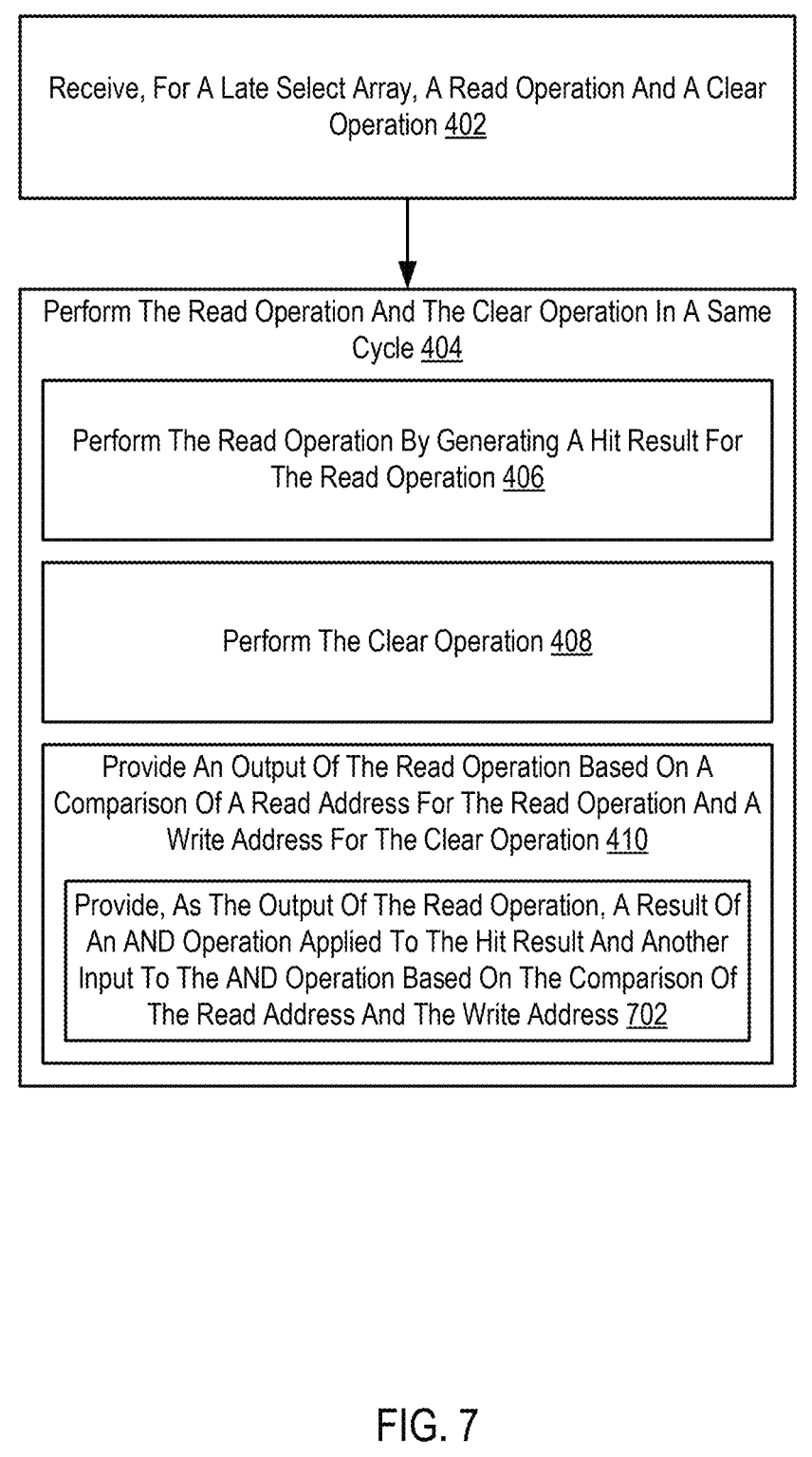

Receive, For A Late Select Array, A Read Operation And A Clear Operation 402

Perform The Read Operation And The Clear Operation In A Same Cycle 404

Perform The Read Operation By Generating A Hit Result For The Read Operation 406

Perform The Clear Operation 408

Provide An Output Of The Read Operation Based On A Comparison Of A Read Address For The Read Operation And A Write Address For The Clear Operation 410

Provide, As The Output Of The Read Operation, A Result Of An AND Operation Applied To The Hit Result And Another Input To The AND Operation Based On The Comparison Of The Read Address And The Write Address 702

FIG. 7

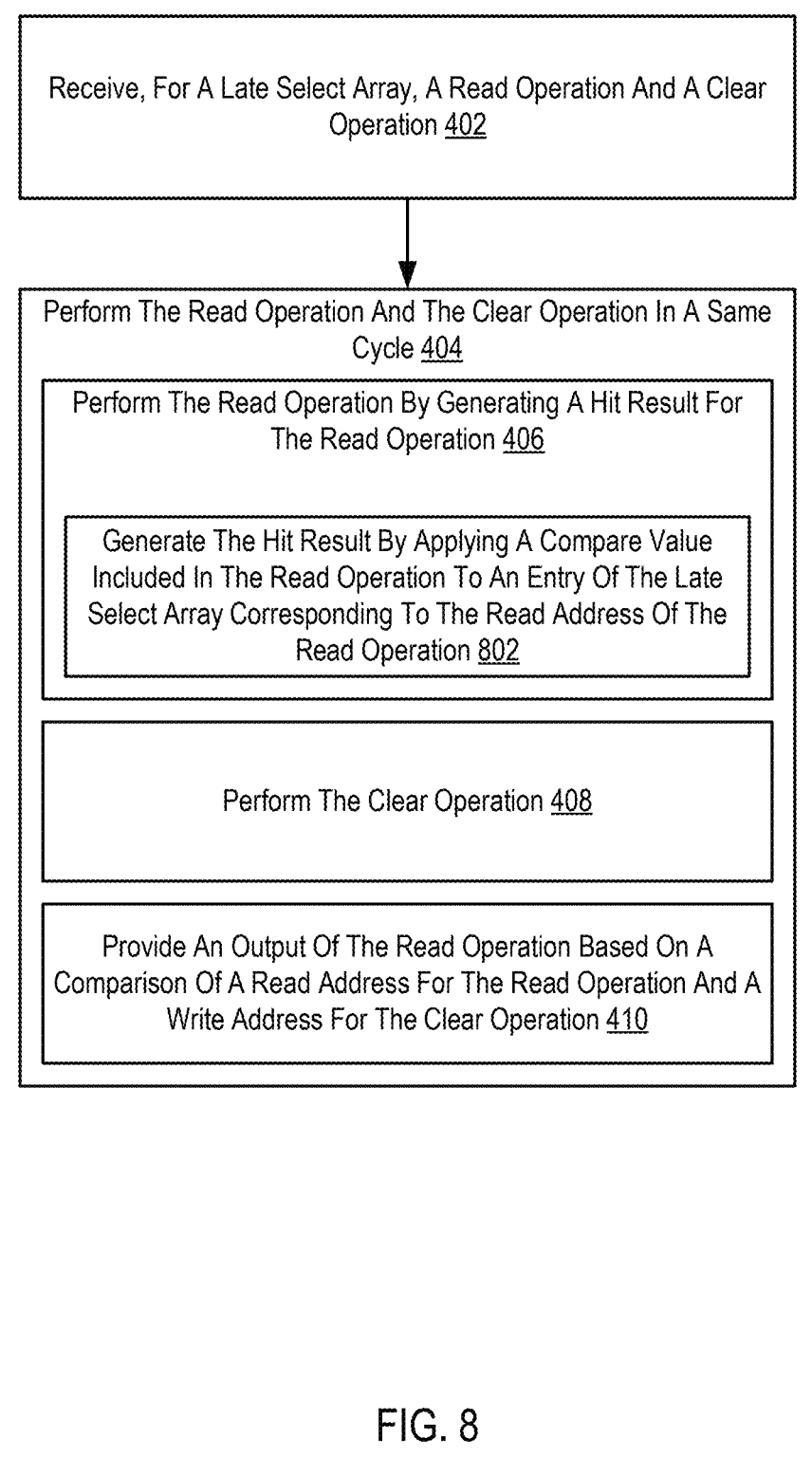

Receive, For A Late Select Array, A Read Operation And A Clear Operation 402

Perform The Read Operation And The Clear Operation In A Same Cycle 404

Perform The Read Operation By Generating A Hit Result For The Read Operation 406

Generate The Hit Result By Applying A Compare Value Included In The Read Operation To An Entry Of The Late Select Array Corresponding To The Read Address Of The Read Operation 802

Perform The Clear Operation 408

Provide An Output Of The Read Operation Based On A Comparison Of A Read Address For The Read Operation And A Write Address For The Clear Operation 410

FIG. 8

PERFORMING A READ OPERATION AND A CLEAR OPERATION IN A LATE SELECT ARRAY IN THE SAME CLOCK CYCLE

BACKGROUND

The present disclosure relates to methods, apparatus, and products for performing a read operation and a clear operation in a late select array in the same clock cycle. Late select arrays store entries mapped to memory addresses that store data indicating whether corresponding portions of cache store valid data. When an entry is no longer valid, it may be cleared by executing a clear operation instruction targeting a memory address to which the entry is mapped. Read operation instructions and clear operation instructions for a late select array may be executed in parallel except when they target the same memory address. This may cause the read operation instruction to be delayed by one instruction cycle to allow the clear operation instruction to complete execution, causing performance degradation.

SUMMARY

According to embodiments of the present disclosure, various methods, systems and products for performing a read operation and a clear operation in a late select array in the same clock cycle are described herein. In some aspects, performing a read operation and a clear operation in a late select array in the same clock cycle includes: receiving, for a late select array stored in memory of a processor, a read operation instruction and a clear operation instruction; executing both the read operation instruction and the clear operation instruction in a single clock cycle, including: loading an entry of the late select array corresponding to a read address included in the read operation instruction; generating a hit result for the read operation instruction based on the entry, wherein the hit result indicates whether a cache stores valid data corresponding to the read operation instruction; clearing an entry of the late select array corresponding to a write address included in the clear operation instruction; and providing an output of the read operation instruction based on a comparison of the read address included in the read operation instruction and the write address included in the clear operation instruction. In some aspects, a computer system may include a processor set; one or more computer-readable storage media; and program instructions stored on the one or more storage media to cause the processor set to perform operations comprising this method. In some aspects, a computer program product may include: one or more computer readable storage media; and program instructions stored on the one or more storage media to perform operations comprising this method.

BRIEF DESCRIPTION OF THE DRAWINGS

FIG. 1 sets forth a diagram of an example computing environment according to some embodiments of the present disclosure.

FIG. 4 sets forth a flowchart of an example method for performing a read operation and a clear operation in a late select array in the same clock cycle in accordance with some embodiments of the present disclosure.

FIG. 5 sets forth a flowchart of another example method for performing a read operation and a clear operation in a late select array in the same clock cycle in accordance with some embodiments of the present disclosure.

FIG. 6 sets forth a flowchart of another example method for performing a read operation and a clear operation in a late select array in the same clock cycle in accordance with some embodiments of the present disclosure.

FIG. 7 sets forth a flowchart of another example method for performing a read operation and a clear operation in a late select array in the same clock cycle in accordance with some embodiments of the present disclosure.

FIG. 8 sets forth a flowchart of another example method for performing a read operation and a clear operation in a late select array in the same clock cycle in accordance with some embodiments of the present disclosure.

DETAILED DESCRIPTION

Figure 2:
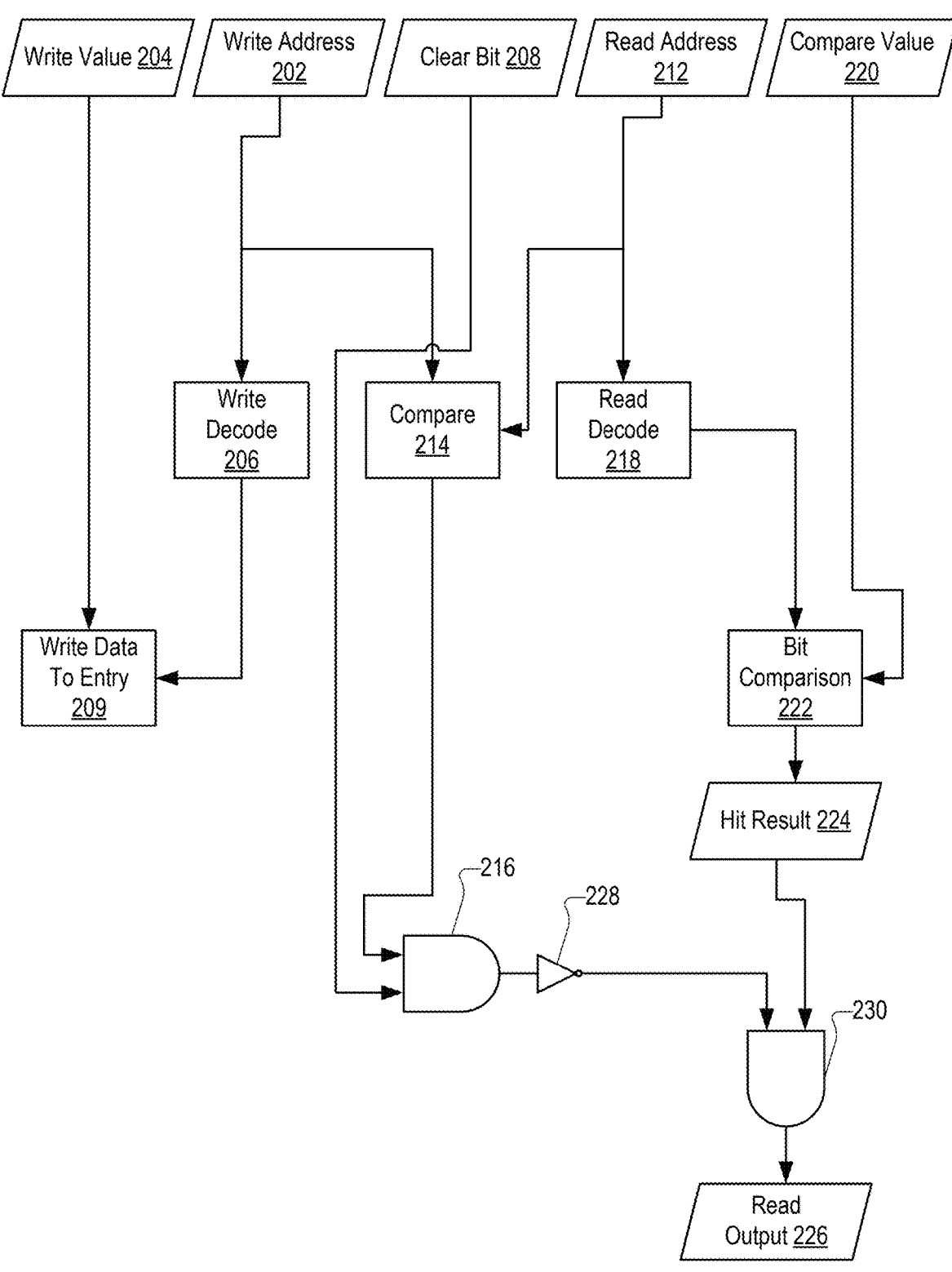
FIG. 2 sets forth a diagram of an example late select array implementation for performing a read operation and a clear operation in a late select array in the same clock cycle in accordance with some embodiments of the present disclosure.

In some aspects, a computer-implemented method may include: receiving, for a late select array stored in memory of a processor, a read operation instruction and a clear operation instruction; executing both the read operation instruction and the clear operation instruction in a single clock cycle, including: loading an entry of the late select array corresponding to a read address included in the read operation instruction; generating a hit result for the read operation instruction based on the entry, wherein the hit result indicates whether a cache stores valid data corresponding to the read operation instruction; clearing an entry of the late select array corresponding to a write address included in the clear operation instruction; and providing an output of the read operation instruction based on a comparison of the read address included in the read operation instruction and the write address included in the clear operation instruction. This provides the technical advantage of enabling read operations and clear operations for late select arrays to be performed in the same cycle, improving overall performance and system utility.

In some aspects, providing an output of the read operation instruction comprises invalidating the hit result for the read operation instruction in response to the read address equaling the write address. This provides the technical advantage of preventing the return of hit results that have been invalidated due to the clear operation, preventing potentially incorrect cache accesses, improving overall performance and system utility.

In some aspects, providing an output of the read operation instruction comprises providing the hit result for the read operation instruction in response to the read address differing from the write address. This provides the technical advantage of gating the hit results of read operations based on the comparison of read and write addresses, improving overall performance and system utility.

In some aspects, the read operation instruction is executed in a first half of the single clock cycle and the clear operation instruction is executed after the read operation instruction in a second half of the single clock cycle. This provides the technical advantage of allowing for a read operation and a clear operation to be performed in the same cycle without introducing delays, improving overall performance and system utility.

In some aspects, providing the output of the read operation instruction comprises providing, as the output of the read operation, a result of an AND operation applied to the hit result and another input to the AND operation based on the comparison of the read address and the write address. This provides the technical advantage of using simple logic operations to gate the hit result based on the comparison of the read address and the write address, improving overall performance and system utility.

In some aspects, wherein the clear operation instruction comprises a write operation instruction including a clear operation indicator and wherein the other input to the AND operation comprises an output of a NAND operation applied to the clear operation indicator and the comparison of the read address and the write address. This provides the technical advantage of further gating the hit result as a function of values that indicate a clear operation, improving overall performance and system utility.

In some aspects, generating the hit result by applying a compare value included in the read operation instruction to the entry of the late select array. This provides the technical advantage of enabling late select array entries that reflect the validity of data across cache sets, improving overall performance and system utility.

In some aspects, the late select array is mapped to an n-way associative cache. This provides the technical advantage of using a late select array to reflect the validity of cached data across multiple sets, improving overall performance and system utility.

In some aspects, a computer system includes: a processor set; one or more computer-readable storage media; and program instructions stored on the one or more storage media to cause the processor set to perform operations comprising: receiving, for a late select array stored in memory of a processor, a read operation instruction and a clear operation instruction; executing both the read operation instruction and the clear operation instruction in a single clock cycle, including: loading an entry of the late select array corresponding to a read address included in the read operation instruction; generating a hit result for the read operation instruction based on the entry, wherein the hit result indicates whether a cache stores valid data corresponding to the read operation instruction; clearing an entry of the late select array corresponding to a write address included in the clear operation instruction; and providing an output of the read operation instruction based on a comparison of the read address included in the read operation instruction and the write address included in the clear operation instruction. This provides the technical advantage of enabling read operations and clear operations for late select arrays to be performed in the same cycle, improving overall performance and system utility.

In some aspects, providing an output of the read operation instruction comprises invalidating the hit result for the read operation instruction in response to the read address equaling the write address. This provides the technical advantage of preventing the return of hit results that have been invalidated due to the clear operation, preventing potentially incorrect cache accesses, improving overall performance and system utility.

In some aspects, providing an output of the read operation instruction comprises providing the hit result for the read operation instruction in response to the read address differing from the write address. This provides the technical advantage of gating the hit results of read operations based on the comparison of read and write addresses, improving overall performance and system utility.

In some aspects, the read operation instruction is executed in a first half of the single clock cycle and the clear operation instruction is executed after the read operation instruction in a second half of the single clock cycle. This provides the technical advantage of allowing for a read operation and a clear operation to be performed in the same cycle without introducing delays, improving overall performance and system utility.

In some aspects, providing the output of the read operation instruction comprises providing, as the output of the read operation, a result of an AND operation applied to the hit result and another input to the AND operation based on the comparison of the read address and the write address. This provides the technical advantage of using simple logic operations to gate the hit result based on the comparison of the read address and the write address, improving overall performance and system utility.

In some aspects, the clear operation instruction comprises a write operation instruction including a clear operation indicator and wherein the other input to the AND operation comprises an output of a NAND operation applied to the clear operation indicator and the comparison of the read address and the write address. This provides the technical advantage of further gating the hit result as a function of values that indicate a clear operation, improving overall performance and system utility.

In some aspects, generating the hit result by applying a compare value included in the read operation instruction to the entry of the late select array. This provides the technical advantage of enabling late select array entries that reflect the validity of data across cache sets, improving overall performance and system utility.

In some aspects, the late select array is mapped to an n-way associative cache. This provides the technical advantage of using a late select array to reflect the validity of cached data across multiple sets, improving overall performance and system utility.

In some aspects, a late select array includes: first circuitry that provides, as a first output, an indication of: whether a write operation instruction for the late select array is a clear operation instruction and that a read address of a read operation instruction for the late select array is equal to a write address of the write operation instruction; second circuitry that provides, as a second output, a hit result for the read operation instruction; and third circuitry that accepts, as input, the first output and the second output and provides, as a third output and based on the first output, either the second output or an invalidated hit result. This provides the technical advantage of enabling read operations and clear operations for late select arrays to be performed in the same cycle, improving overall performance and system utility.

In some aspects, the first circuitry comprises NAND logic that accepts, as a first input, an indication as to whether the read address and the write address are equal and accepts, as a second input, an indication as to whether the write operation instruction is a clear operation. This provides the technical advantage of further gating the hit result as a function of values that indicate a clear operation, improving overall performance and system utility.

In some aspects, the second circuitry is configured to apply a compare value from the read operation to an entry in the late select array corresponding to the read address of the read operation instruction. This provides the technical advantage of enabling late select array entries that reflect the validity of data across cache sets, improving overall performance and system utility.

In some aspects, wherein the late select array is mapped to an n-way associative cache. This provides the technical advantage of using a late select array to reflect the validity of cached data across multiple sets, improving overall performance and system utility.

A late select array may include multiple entries each describing a particular portion of memory, such as portions of an n-way associative cache. Each entry may include bits indicating whether valid data is stored at a corresponding portion of memory. For example, each bit in an entry may indicate, for a portion of memory across multiple sets, whether valid data is stored in each set. A late select array entry may be cleared by setting a valid bit (e.g., a bit indicating validity) to zero where the entry is no longer valid. In some existing implementations, if a read operation and a clear operation directed to the same entry in the late select array, the read operation must be delayed until the clear operation is complete. This may introduce a cycle delay to some processors. In some other existing implementations, a clear operation may be implemented as a "write through" operation whereby the read operation and clear operation are performed in the same cycle by having the read operation return the data that is written to the entry (e.g., the cleared data). These implementations may introduce difficulties in designing the late select array. For example, re-using bit lines for read and write operations may cause timing constraints and may introduce potential false reads before write fails.

With reference now to FIG. 1, shown is an example computing environment according to aspects of the present disclosure. Computing environment 100 contains an example of an environment for the execution of at least some of the computer code involved in performing the various methods described herein, such as the late select array module 107. In addition to the late select array module 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in late select array module 107.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in late select array module 107 typically includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 sets forth an example late select array implementation in accordance with some embodiments of the present disclosure. Readers will appreciate that FIG. 2 depicts a portion of the functionality of a late select array related to performing read and clear operations in the same cycle and that not all functional components of the late select array are shown for the sake of clarity. In some embodiments, the late select array may be directory for or is otherwise mapped to an n-way associative cache. Each entry in the late select array may correspond to parallel blocks in cache across multiple sets (e.g., blocks of a particular index across all set). Each entry may store multiple bits each corresponding to a particular set of the n-way associative cache. For example, for an eight-way associative cache, each entry in the late select array may include eight bits with each bit corresponding to a different set. In some embodiments, the entry may store multiple tag-bit pairs each corresponding to a different set. In order to determine if some data to be read is stored in cache, a read operation is issued to the late select array. A read operation directed to the late select array serves to determine, based on the contents of the late select array, whether some data to be read is stored in cache. The read operation (e.g., a read operation instruction) includes a read address and a compare value. The read address is mapped to a particular entry in the late select array, while the compare value is a tag corresponding to a particular set. An entry in the late select array corresponding to the read address is loaded. If the entry stores a tag matching the compare value and the bit corresponding to the matching tag is set to "valid" (e.g., to one) it indicates that the data in the block of the corresponding set of cache is valid. Thus, if the bits of the entry corresponding to the set bits of the compare value are also set this indicates that there is a cache hit and data can be read from cache from the set and block corresponding to the read operation and late select array entry. Readers will appreciate that the approaches set forth herein are described with respect to various attributes or parameters of operations (e.g., read operations, write operations, and clear operations), such attributes and parameters may be included in the instructions for those operations. Accordingly, the approaches set forth herein may use the terms "operation" and "operation instruction" interchangeably. Moreover, the discussion set forth herein may use various terms such as "executing," "performing," and the like with respect to both an "operation" and "operation instruction" interchangeably.

If a set in cache is invalidated the corresponding entry in the late select array may be cleared by setting all stored bits to zero. This may be performed by issuing a particular type of write operation to the entry, a clear operation. In some embodiments, a clear operation may be distinguished from other write operations using one or more bits of the write operation. For example, where these one or more bits are set to one this may indicate that the write operation is a clear operation. In some embodiments, the late select array may include ports for both read and write operations, thereby allowing read and write operations to be performed in the same cycle. For example, a read operation may be performed in the first half of a cycle while a write operation, including a clear operation, may be performed in the latter, second half of the cycle. If a read operation and a clear operation are received for execution in the same cycle that target the same entry in the late select array it must be ensured that the result of the read operation reflects the clear operation. In other words, the result of the read operation should reflect that the corresponding portion of cache has been invalidated, thereby indicating that the data to be read cannot be read from cache.

Accordingly, in the example late select array implementation of FIG. 2, assume that a read operation and a clear operation are received for execution in the same cycle. The clear operation includes a write address 202, mapped to some entry of the late select array, and a write value 204 to be written into the mapped entry. At block 206 a write decode is performed in order to identify the late select array entry corresponding to the write address 202. At block 209 the write value 204 is written to the entry. Readers will appreciate that this functionality may be performed similarly for clear operations and non-clear write operations. For example, a write value 204 of zero directed to the valid bit may be used for clear operations while other write values 204 may be used for other write operations. As the write operation of FIG. 2 is a clear operation the write operation also includes a clear bit 208 that, when set, indicates that the write operation is a clear operation.

In order to determine if the read operation and the clear operation are targeting the same entry in the late select array, a read address 212 of the read operation is compared to the write address 202 of the clear operation at block 214. For example, the result of this comparison may be a one where the read address 212 and the write address 202 are equal and a zero otherwise. The result of this comparison and the clear bit 208 are provided as input to an AND gate 216. The output of the AND gate 216 is an indication as to whether both the write operation is a clear operation (e.g., that the clear bit 208 is set) and that the read address 212 and write address 202 are identical. In other words, the AND gate 216 will provide a zero output where the write address 202 and read address 212 do not match, where the clear bit 208 is not set, or both.

The read address 212 is decoded at block 218 and the corresponding entry of the late select array is loaded. The contents of this entry and the compare value 220 of the read operation are compared at block 222 to produce a hit result 224. The hit result 224 is an indication as to whether the cache stores valid data at the portion of the cache corresponding to the read address 212 and at the set corresponding to the compare value 220. Accordingly, the compare value 220 is compared to the tags stored in the entry of the late select array and, if a matching tag is stored in the entry, determining if the corresponding valid bit is set. For example, the hit result 224 may include multiple bits equal to a number of sets in cache. Where the compare value 220 matches a tag in the entry, the corresponding bit of the hit result 224 may be set to the corresponding bit for the matching tag. Continuing with this example, where the compare value 220 matches a tag for set three with a valid bit set, the bit of the hit result 224 corresponding to set three may be set to one while remaining bits are set to zero. Should the bit of the matching tag be set to zero or should no matching tag be found the hit result 224 may be set to all zeroes, indicating a cache miss.

Where the read operation and clear operation target different entries of the late select array the hit result 224 should be provided as output of the read operation (e.g., as read output 226). Where the read operation and clear operation target equal entries of the late select array the hit result 224 should be invalidated such that an indication of no hit is provided as the read output 226. Accordingly, the hit result 224 and an inverted output of the AND gate 216 (e.g., the output of inverter 228) are provided as inputs to AND gate 230. Here, the AND gate 230 will always provide a negative or zero read output 226 where the output from the AND gate 216 is positive due to the inverter 228. Where the output from the AND gate 216 is negative, resulting in a positive input to the AND gate 230 via the inverter 228, the AND gate 230 will provide the hit result 224 as the read output 226.

Figure 3:
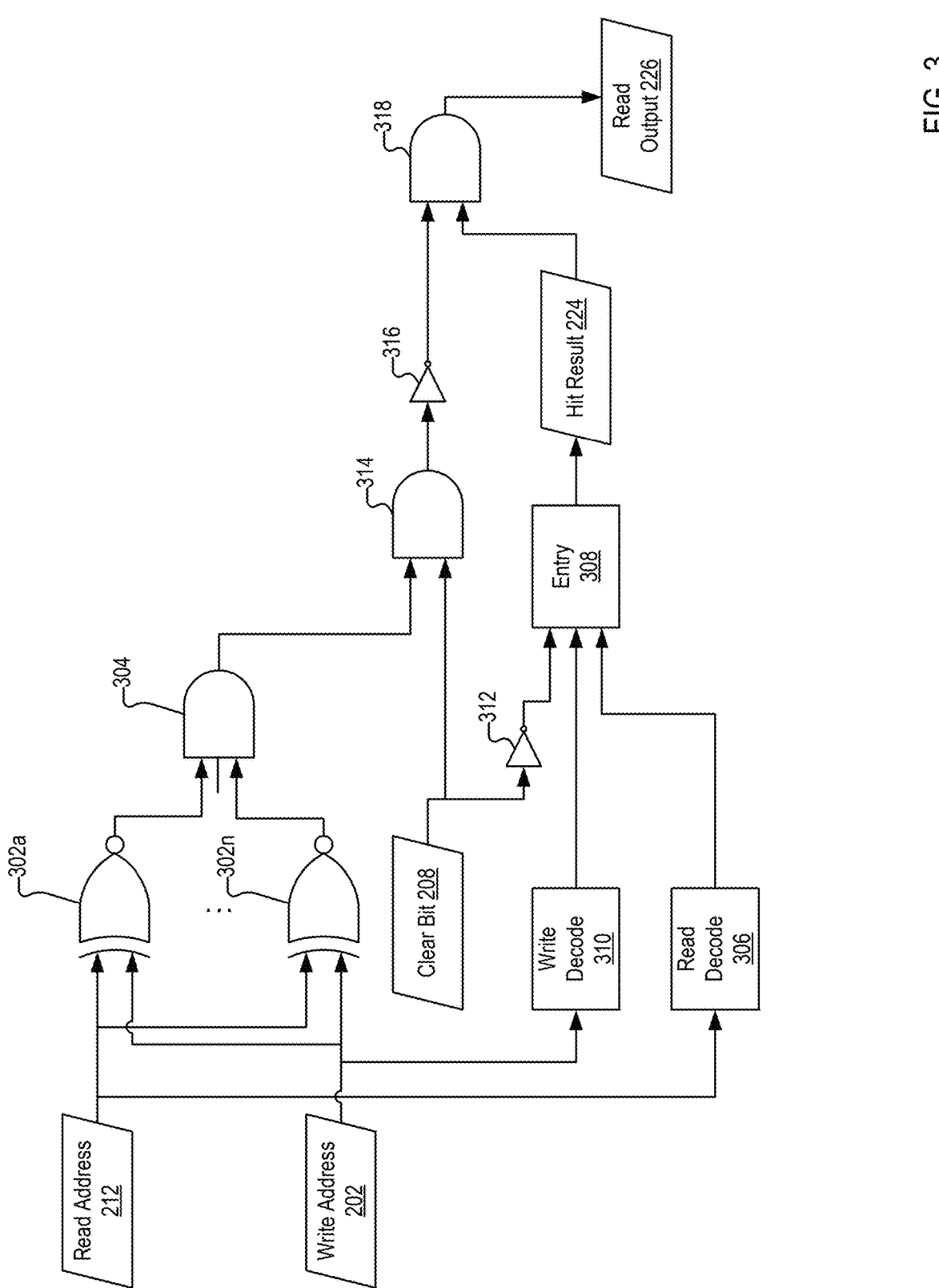
FIG. 3 sets forth a diagram of another example late select array implementation for performing a read operation and a clear operation in a late select array in the same clock cycle in accordance with some embodiments of the present disclosure.

FIG. 3 sets forth another example late select array implementation for performing a read operation and a clear operation in a late select array in the same clock cycle in accordance with some embodiments of the present disclosure. Here, in order to determine if a read operation and a clear operation are targeting the same address (e.g., the same entry of the late select array), each pair of corresponding bits from the read address 212 and the write address 202 are provided as inputs to respective XNOR gates 302a-n. Each XNOR gate 302a-n will provide, as output, a one where the input pair of bits match and a zero otherwise. The outputs of each XNOR gate 302a-n may then be provided as input to an AND gate 304. The AND gate 304 will provide, as output, a one where all inputs received from the XNOR gates 302a-n are set to one and a zero otherwise.

The read operation is performed by decoding the read address 212 at block 306 to load an entry 308 to produce a hit result 224 as described above. The clear operation is performed by decoding the write address 202 at block 310 and clearing the entry 308. This may include, for example, writing the entry 308 with an inverted clear bit 208 (e.g., via inverter 312) to set the entry 308 to all zeroes. The clear bit 208 and the output of AND gate 304 (e.g., indicating whether the read address 212 and write address 202 are identical) are provided as inputs to AND gate 314. The AND gate 314 will provide a one as output where both the read address 212 and write address 202 are identical and the clear bit 208 is set, and otherwise provide an output of zero. The inverted output of the AND gate 314, inverted using the inverter 316, are provided as input to AND gate 318. Thus, where the output of inverter 316 is zero, indicating that the clear bit 208 is set and the read address 212 and write address 202 are identical, the AND gate 318 will always produce a read output 226 of zero, thereby invalidating the hit result 224. Otherwise the AND gate 318 will provide the hit result 224 as the read output 226.

Readers will appreciate that the example late select array implementations of FIGS. 2 and 3 are merely illustrative and that other configurations are also contemplated within the scope of the present disclosure. Particularly, the functionality described above may be implemented using various alternative but functionally equivalent configurations of data pathways, logic gates, and the like. Readers will also appreciate that the functionality set forth herein allows for read operations and clear operations to be performed in the same cycle (e.g., as a "clear through" clear operation) by effectively gating hit results of read operations depending on whether a clear operation is being performed on the same address as the read operation.

For further explanation, FIG. 4 sets forth a flowchart of an example method of performing a read operation and a clear operation in a late select array in the same clock cycle in accordance with some embodiments of the present disclosure. The method of FIG. 4 may be performed, for example, by the late select array module 107 of FIG. 1 and/or any of the example late select array implementations set forth above in FIGS. 2 and 3. The method of FIG. 4 includes receiving 402, for a late select array, a read operation and a clear operation (e.g., a read operation instruction and a clear operation instruction). The clear operation is a particular type of write operation that causes a particular entry of the late select array to be invalidated by zeroing out a valid bit (e.g., a bit indicating validity) of the particular entry. The read operation is an operation to determine whether some data identified by the read operation is available from cache. Thus, the read operation will produce, as output, an indication as to whether the data identified by the read operation is available from cache (e.g., a cache hit or miss).

The method of FIG. 4 also includes performing 404 the read operation and the clear operation in a same cycle. In other words, the read operation instruction and the clear operation instruction are both executed in a single clock cycle. For example, in some embodiments, the read operation instruction may be executed in a first half of a given clock cycle and the clear operation instruction may be executed in the later, second half of the given clock cycle. As the read operation is used to determine whether some data is available from cache, in some embodiments, performing 404 the read operation and the clear operation in a same cycle includes performing 406 the read operation by generating a hit result for the read operation. In some embodiments, performing 406 the read operation includes decoding a read address included in the read operation to load a corresponding entry from the late select array. One or more bits of the loaded entry may then be referenced to determine if their corresponding sets in cache store valid data. In some embodiments, a given memory address or portion of a memory address (e.g., of a read address or write address) may map to blocks across multiple sets in cache. For example, in some embodiments, a given memory address may be mapped to a particular block index across multiple sets. A late select array entry corresponding to the given memory address indicates the validity of each block in the particular block index across all sets. Thus, a hit result may be generated by determining whether a particular bit of the late select array entry is set to one, indicating valid cached data. In some embodiments, the particular bit of the late select array entry may correspond to a compare value included in the read operation.

Performing 404 the read operation and the clear operation in a same cycle also includes performing 408 the clear operation. This may include, for example, zeroing out a late select array entry mapped to a write address of the clear operation by setting each bit of the late select array entry to zero. As both the read operation and the clear operation are performed 404 in the same cycle, this clear operation may be considered a "clear through" operation where the read operation and clear operation target the same entry of the late select array, analogous to a "write through" operation that can be performed in the same cycle as a read operation.

As the read operation and the clear operation may have targeted the same entry of the late select array there is the possibility that the previously generated hit result may be invalid in light of the entry targeted by the read operation being cleared. Accordingly, in some embodiments, performing 404 the read operation and the clear operation in a same cycle also includes providing 410 an output of the read operation based on a comparison of a read address for the read operation and a write address for the clear operation. In other words, the hit result to be provided by the read operation is gated based on whether the read address for the read operation and the write address for the clear operation are equal.

Readers will appreciate that the approaches set forth above allow for read operations and clear operations to be performed in the same cycle even when targeting the same entry of a late select array. This improves overall system utility and performance by allowing for read operations and clear operations to target the same entry of the late select array without introducing any cycle delays. Moreover, the approaches set forth above do not require the clear operation to be implemented as a "write through" operation whereby the result of the read operation is the data as cleared by the clear operation, which presents design and implementation complications for the late select array.

For further explanation, FIG. 5 sets forth a flowchart of another example method of performing a read operation and a clear operation in a late select array in the same clock cycle in accordance with some embodiments of the present disclosure. The method of FIG. 5 is similar to FIG. 4 in that the method of FIG. 5 also includes: receiving 402, for a late select array, a read operation and a clear operation; performing 404 the read operation and the clear operation in a same cycle, including: performing 406 the read operation by generating a hit result for the read operation; performing 408 the clear operation; and providing 410 an output of the read operation based on a comparison of a read address for the read operation and a write address for the clear operation.

The method of FIG. 5 differs from FIG. 4 in that providing 410 an output of the read operation based on a comparison of a read address for the read operation and a write address for the clear operation includes invalidating 502 the hit result for the read operation in response to the read address equaling the write address. As the read address equals the write address they map to the same entry in the late select array. Accordingly, the entry used in generating the hit result has also been cleared by the clear operation. Thus, the previously generated hit result should be invalidated and a result of zero (e.g., indicating no cache hit) should be provided 410 as the output of the read operation regardless of the value of the previously generated hit result. In other words, the previously generated hit result may be invalidated by providing an output indicating a cache miss independent of the value of the previously generated hit result.

For example, in some embodiments, a comparison between the read address and the write address may be performed. The result of this comparison may be a one where the read address and write address are identical and zero where the read address and write address are different. A logic gate may accept, as input, the previously generated hit result and another input based on the result of this comparison so as to effectively gate the previously generated hit result as a function of this comparison. Where the comparison indicates that the read and write address are identical, the result of this comparison (e.g., an any intervening logic such as inversion) will then cause this logic gate to always output a zero or other indication of a cache miss as can be appreciated.

For further explanation, FIG. 6 sets forth a flowchart of another example method of performing a read operation and a clear operation in a late select array in the same clock cycle in accordance with some embodiments of the present disclosure. The method of FIG. 6 is similar to FIG. 4 in that the method of FIG. 6 also includes: receiving 402, for a late select array, a read operation and a clear operation; performing 404 the read operation and the clear operation in a same cycle, including: performing 406 the read operation by generating a hit result for the read operation; performing 408 the clear operation; and providing 410 an output of the read operation based on a comparison of a read address for the read operation and a write address for the clear operation.

The method of FIG. 6 differs from FIG. 4 in that providing 410 an output of the read operation based on a comparison of a read address for the read operation and a write address for the clear operation includes providing 602 the hit result for the read operation in response to the read address differing from the write address. As the read address differs from the write address the read operation and the clear operation target different entries in the late select array. Thus, the clear operation does not affect the result of the read operation and its corresponding hit result. Accordingly, the hit result does not need to be invalidated and can be provided 602 as the output of the read operation.

For further explanation, FIG. 7 sets forth a flowchart of another example method of performing a read operation and a clear operation in a late select array in the same clock cycle in accordance with some embodiments of the present disclosure. The method of FIG. 7 is similar to FIG. 4 in that the method of FIG. 7 also includes: receiving 402, for a late select array, a read operation and a clear operation; performing 404 the read operation and the clear operation in a same cycle, including: performing 406 the read operation by generating a hit result for the read operation; performing 408 the clear operation; and providing 410 an output of the read operation based on a comparison of a read address for the read operation and a write address for the clear operation.

The method of FIG. 7 differs from FIG. 4 in that providing 410 an output of the read operation based on a comparison of a read address for the read operation and a write address for the clear operation includes providing 702, as the output of the read operation, a result of an AND operation applied to the hit result and another input to the AND operation based on the comparison of the read address and the write address. In some embodiments, this other input may include a value that will be equal to zero where the read address and write address are identical and where a clear operation is being performed. Thus, where the read address and the write address are identical and a clear operation is being performed the result of the AND operation will always be zero, indicating a cache miss. Where the read address and write address differ and a clear operation is not being performed (e.g., some other write operation is being performed) the result of the AND operation will be equal to the hit result.

For example, in some embodiments, the clear operation may be implemented as a write operation that includes one or more bits designating it as a clear operation (e.g., a clear operation indicator). Accordingly, in some embodiments, this other input to the AND operation may include the output of a NAND operation applied to the clear operation indicator and the comparison of the read address and the write address. Thus, the NAND operation will provide a zero output where the read address and write address are equal (e.g., the result of the comparison) and where the clear operation indicator is set. Otherwise, the NAND operation will provide an output of one, allowing for the hit result to be provided as output to the AND operation described above. The NAND operation may be implemented using a dedicated NAND logic gate, a combination of another AND gate and an inverter coupled to the output of the other AND gate, or by other approaches. Readers will appreciate that, although the approaches set forth herein are described with respect to particular logical operations, these approaches are also applicable to alternative, functionally equivalent implementations of these operations.

For further explanation, FIG. 8 sets forth a flowchart of another example method of performing a read operation and a clear operation in a late select array in the same clock cycle in accordance with some embodiments of the present disclosure. The method of FIG. 8 is similar to FIG. 4 in that the method of FIG. 8 also includes: receiving 402, for a late select array, a read operation and a clear operation; performing 404 the read operation and the clear operation in a same cycle, including: performing 406 the read operation by generating a hit result for the read operation; performing 408 the clear operation; and providing 410 an output of the read operation based on a comparison of a read address for the read operation and a write address for the clear operation.

The method of FIG. 8 differs from FIG. 4 in that performing 406 the read operation by generating a hit result for the read operation also includes generating 802 the hit result by applying a compare value included in the read operation to an entry of the late select array corresponding to the read address of the read operation. The compare value of the read operation identifies a particular set of an n-way associative cache. As the read address of the read operation is mapped to a particular portion of cache across multiple sets the compare value serves to identify a particular set in that particular portion of cache. Thus, the read operation serves to determine whether valid data is stored in a particular set of a particular portion of cache, thereby resulting in a cache hit. Accordingly, the hit result may be generated 802 as a function of the compare value and the entry of the late select array. For example, in some embodiments, the hit result may be generated by comparing the compare value to tags of the entry of the array and, if the entry stores a matching tag, determining whether a bit corresponding to the matching tag is set to "valid."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, for a late select array stored in memory of a processor, a read operation instruction and a clear operation instruction;
   executing both the read operation instruction and the clear operation instruction in a single clock cycle, including:
      loading an entry of the late select array corresponding to a read address included in the read operation instruction;
      generating a hit result for the read operation instruction based on the entry, wherein the hit result indicates whether a cache stores valid data corresponding to the read operation instruction;
      clearing an entry of the late select array corresponding to a write address included in the clear operation instruction; and
      providing an output of the read operation instruction based on a comparison of the read address included in the read operation instruction and the write address included in the clear operation instruction.

2. The computer-implemented method of claim 1, wherein providing an output of the read operation instruction comprises invalidating the hit result for the read operation instruction in response to the read address equaling the write address.

3. The computer-implemented method of claim 1, wherein providing an output of the read operation instruction comprises providing the hit result for the read operation instruction in response to the read address differing from the write address.

4. The computer-implemented method of claim 1, wherein the read operation instruction is executed in a first half of the single clock cycle and the clear operation instruction is executed after the read operation instruction in a second half of the single clock cycle.

5. The computer-implemented method of claim 1, wherein providing the output of the read operation instruction comprises providing, as the output of the read operation, a result of an AND operation applied to the hit result and another input to the AND operation based on the comparison of the read address and the write address.

6. The computer-implemented method of claim 5, wherein the clear operation instruction comprises a write operation instruction including a clear operation indicator and wherein the other input to the AND operation comprises an output of a NAND operation applied to the clear operation indicator and the comparison of the read address and the write address.

7. The computer-implemented method of claim 1, wherein generating the hit result by applying a compare value included in the read operation instruction to the entry of the late select array.

8. The computer-implemented method of claim 1, wherein the late select array is mapped to an n-way associative cache.

9. A computer system comprising:

a processor set;

one or more computer-readable storage media; and program instructions stored on the one or more storage media to cause the processor set to perform operations comprising:

receiving, for a late select array stored in memory of a processor, a read operation instruction and a clear operation instruction;

executing both the read operation instruction and the clear operation instruction in a single clock cycle, including:

loading an entry of the late select array corresponding to a read address included in the read operation instruction;

generating a hit result for the read operation instruction based on the entry, wherein the hit result indicates whether a cache stores valid data corresponding to the read operation instruction;

clearing an entry of the late select array corresponding to a write address included in the clear operation instruction; and providing an output of the read operation instruction based on a comparison of the read address included in the read operation instruction and the write address included in the clear operation instruction.

10. The computer system of claim 9, wherein providing an output of the read operation instruction comprises invalidating the hit result for the read operation instruction in response to the read address equaling the write address.

11. The computer system of claim 9, wherein providing an output of the read operation instruction comprises providing the hit result for the read operation instruction in response to the read address differing from the write address.

12. The computer system of claim 9, wherein the read operation instruction is executed in a first half of the single clock cycle and the clear operation instruction is executed after the read operation instruction in a second half of the single clock cycle.

13. The computer system of claim 9, wherein providing the output of the read operation instruction comprises providing, as the output of the read operation, a result of an AND operation applied to the hit result and another input to the AND operation based on the comparison of the read address and the write address.

14. The computer system of claim 13, wherein the clear operation instruction comprises a write operation instruction including a clear operation indicator and wherein the other input to the AND operation comprises an output of a NAND operation applied to the clear operation indicator and the comparison of the read address and the write address.

15. The computer system of claim 9, wherein generating the hit result by applying a compare value included in the read operation instruction to the entry of the late select array.

16. The computer system of claim 9, wherein the late select array is mapped to an n-way associative cache.

17. A late select array comprising:

first circuitry that provides, as a first output, an indication of: whether a write operation instruction for the late select array is a clear operation instruction and that a read address of a read operation instruction for the late select array is equal to a write address of the write operation instruction;

second circuitry that provides, as a second output, a hit result for the read operation instruction; and third circuitry that accepts, as input, the first output and the second output and provides, as a third output and based on the first output, either the second output or an invalidated hit result.

18. The late select array of claim 17, wherein the first circuitry comprises NAND logic that accepts, as a first input, an indication as to whether the read address and the write address are equal and accepts, as a second input, an indication as to whether the write operation instruction is a clear operation.

19. The late select array of claim 17, wherein the second circuitry is configured to apply a compare value from the read operation to an entry in the late select array corresponding to the read address of the read operation instruction.

20. The late select array of claim 17, wherein the late select array is mapped to an n-way associative cache.

* * * * *